United States Patent
Swartz et al.

(10) Patent No.: US 8,279,484 B2
(45) Date of Patent: Oct. 2, 2012

(54) MULTI-FUNCTION MACHINE HAVING A SERVICE LOG SYSTEM

(75) Inventors: Craig R. Swartz, Webster, NY (US); Bernard W. Wilson, Rochester, NY (US); Benigno Ruiz, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1068 days.

(21) Appl. No.: 11/870,504

(22) Filed: Oct. 11, 2007

(65) Prior Publication Data

US 2009/0097077 A1    Apr. 16, 2009

(51) Int. Cl.
*H04N 1/00* (2006.01)

(52) U.S. Cl. ........... 358/1.6; 358/474; 382/321; 399/10; 399/11

(58) Field of Classification Search .......................... None
See application file for complete search history.

(56) References Cited

U.S. PATENT DOCUMENTS

| | | | | |
|---|---|---|---|---|
| 5,001,769 | A * | 3/1991 | Reid-Green et al. | 382/283 |
| 5,982,995 | A * | 11/1999 | Covert et al. | 358/1.15 |
| 7,289,685 | B1 * | 10/2007 | Wolff et al. | 382/317 |
| 2003/0128991 | A1 * | 7/2003 | Carling et al. | 399/8 |
| 2004/0190019 | A1 * | 9/2004 | Li et al. | 358/1.9 |
| 2005/0259292 | A1 * | 11/2005 | Tokimoto et al. | 358/1.15 |
| 2007/0146793 | A1 * | 6/2007 | Korn | 358/1.18 |
| 2007/0292145 | A1 * | 12/2007 | Drose et al. | 399/8 |
| 2008/0002234 | A1 * | 1/2008 | Corso et al. | 358/405 |

* cited by examiner

*Primary Examiner* — Charlotte M Baker
*Assistant Examiner* — Aaron R Gerger
(74) *Attorney, Agent, or Firm* — Gibb & Riley, LLC

(57) ABSTRACT

A multi-function machine is provided. The multi-function machine includes a scanning module for scanning in a document and generating a corresponding image. The multi-function machine also includes one or more processors operatively connected to a user interface module executable by a user and a service log module having a set of programmable instructions configured for execution by the at least one processor for receiving an image corresponding to a scanned in service log form having service log information. Additionally, a service log record with service log information from the scanned in image is included.

17 Claims, 4 Drawing Sheets

DATE AND TIME OF SERVICE  AF

TYPE OF SERVICE PERFORMED

SERIAL NUMBER         AF                    ← 202
FAULT CODES           AF
CRU LIFE              AF
ERROR MESSAGE         AF
METER READS           AF
SERVICE PARTS         AF
SERVICE REMINDER      AF
SERVICE TECH.         USER FILL FIELDS
COMPANY PERFORMS      USER FILL FIELDS
SERVICE
                                            204

DESCRIPTION OF SERVICE
USER FILL FIELDS

MULTI-FUNCTION MACHINE HAVING A SERVICE LOG SYSTEM

BACKGROUND

1. Technical Field

The present disclosure relates to a multi-function machine, and more particularly, to a multi-function machine having a system for maintaining service logs.

2. Description of Related Art

During the operational life of a multi-function machine (MFM), the MFM may require servicing, and it follows that the MFM will typically include a service log. The service log is used to maintain a record of all the work and/or services that were performed on the MFM. The work that the MFM might require may include, but is not limited to, routine maintenance checks and/or needed repairs. The work is generally performed by service personal. After the routine maintenance checks and/or needed repairs are completed by the service personal, the service personal may update the service log (e.g., the service personal may enter into the log the type of work performed). The log may be digitally stored on a storage device associated with the MFM or separate and distinct from the MFM. Alternatively, the log may be stored on a non-digital medium, such as a log-book for handwritten log entries.

Throughout the operational life of the MFM it is common to have several different service personal individually perform work on the MFM on separate occasions. After the service personal finishes their work on the MFM the service log is updated and stored someplace on or in the vicinity of the MFM.

With storage in around the MFM's area being finite and sometimes cluttered, there exists the likelihood that the service log may not be conspicuously and/or consistently stored in the same location. Consequently, if the service personal cannot locate the service log, there exists the possibility that the service log will not be properly updated, which may lead to valuable data being lost.

There exists, therefore, a need for a service log system that provides for an efficient common means for maintaining, storing and/or distributing service logs.

SUMMARY

There is provided in accordance with the present disclosure a multi-function machine including a scanning module for scanning in a document and generating a corresponding image. The multi-function machine includes one or more processors operatively connected to a user interface module and executable by a user. Additionally, the multi-function machine includes a service log module having a set of programmable instructions configured for execution by the one or more processors for receiving an image corresponding to a scanned in service log form having service log information. Also provided is a service log record with service log information from the scanned in image.

The present disclosure also provides a method for maintaining and servicing a multi-function machine. The method including the steps of a) providing a multi-function machine comprising: a scanning module for scanning in a document and generating a corresponding image; at least one processor operatively connected to a user interface module executable by a user; and a service log module having a set of programmable instructions configured for execution by the at least one processor for receiving an image corresponding to a scanned in service log form having service log information. The method further includes the steps of b) generating an initial blank service log form; c) auto filling in known data into the blank form; d) printing the auto filled blank form; e) receiving a scanned in image of a completed service log form; f) performing OCR on the user entry fields of the image for translating it into update data; and g) updating the service record with the translated update data and the auto filled data.

BRIEF DESCRIPTION OF THE DRAWINGS

Various embodiments of the present disclosure will be described herein below with reference to the figures wherein:

FIG. 2 illustrates a service log form in accordance with the present disclosure;

DETAILED DESCRIPTION

Figure 1:
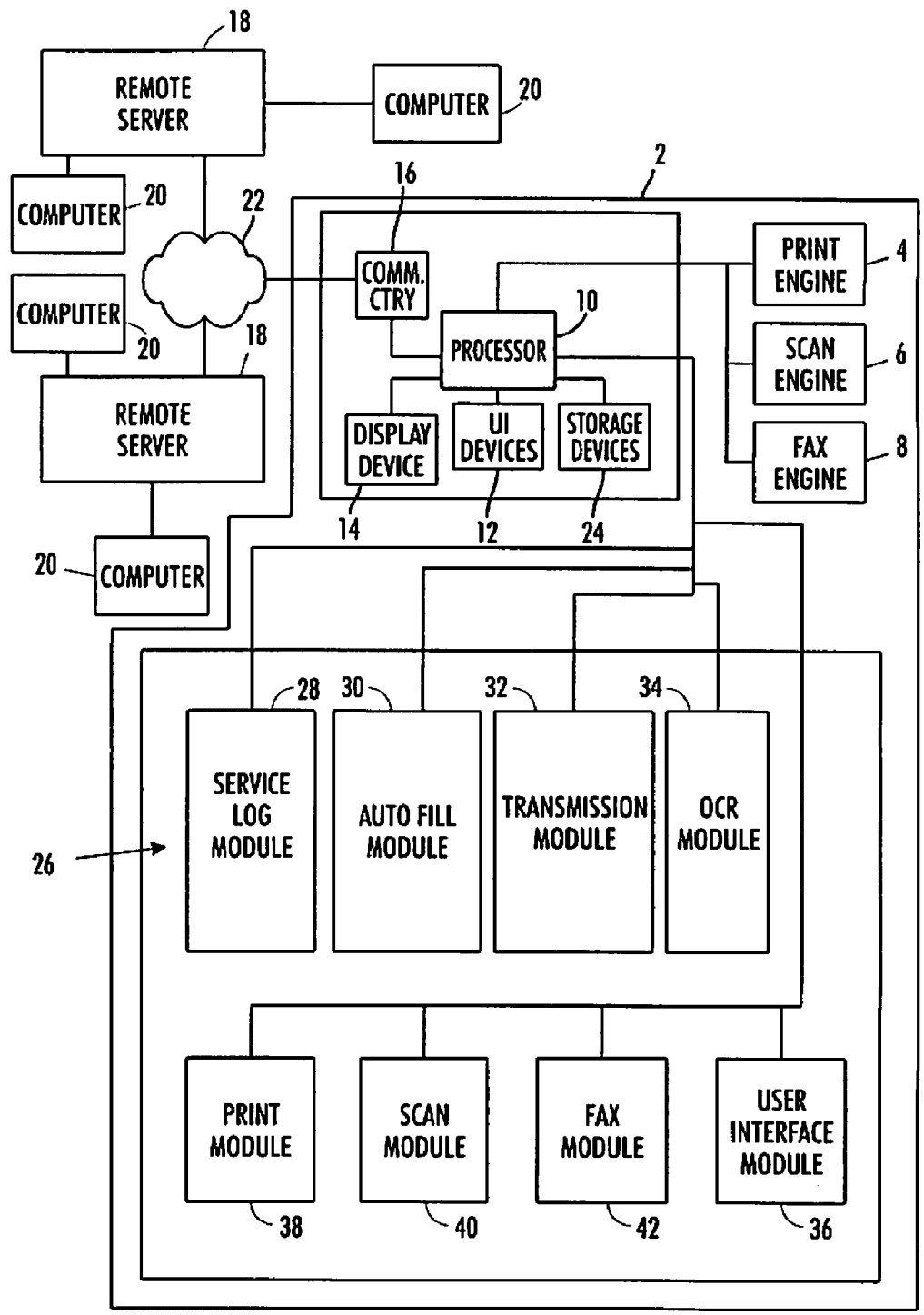
FIG. 1 is a block diagram of a multi-function machine including a service log system in accordance with the present disclosure.

An MFM is provided with a service log system including a service log creation module which accepts service log entries, stores the entries into a cumulative report, e.g. a service log record, and outputs the report upon request, such as by transmitting it to a processor or printing it out. Data included in the service log entries may be entered by a scanner through which user entered data is scanned in, a user interface and/or by automatically filling in the data. The term "MFM" as used herein encompasses any apparatus or system, such as a digital copier, xerographic printing system, laser printing system, ink jet printing system, bubble-jet printing system, reprographic printing system, bookmaking machine, facsimile machine, multifunction machine, textile marking machine, etc., which performs a marking output function, copying function, faxing function and/or scanning function for any purpose. The modality for marking may include, for example, applying toner, ink, dye, etc., to the substrate or embossing, peening, etching, etc. the substrate.

In the description below, keep in mind that an initial blank service form and a service log record is stored in the storage device by the service log module. The service log record is configured for data storage. The blank service form may be configured for read and write applications. The blank service form could include permanent auto-filled information. The service log record is updated each time a filled form is submitted and confirmed. The previous version may be saved until the new updated version is confirmed. The service log record will keep a record of all services performed on the machine. A transmission module may be configured to generate reports from the service log record in accordance with the user's request. The report might include the most recent service log, all of the service logs, only selected data from the service logs, etc.

A printed or displayed (e.g. via a graphical user interface (GUI)) blank service form is used for each service call, which can be initiated upon a request to service the machine from someone with the necessary privileges. The request might be made in one or more of the following manners: one one-touch key; presenting a service tag with a barcode or RFID tag;

keyboard entry; and entry via the GUI. A pre-printed form may also be employed. The user (serviceman who has privileges) performs the servicing tasks and enters information into the form. The information can be entered via the GUI, typed onto the printed form or handwritten onto the printed form. The manually updated printed form is scanned in. The service log record may be updated with the image, or OCR is performed and translated into service update data. Note that only the user entry fields should be translated via OCR into data; however, it is contemplated that the auto fill fields may also be translated via OCR. Auto fill data should automatically be entered into the service log record. The service update data is used to update the service log record. The service update data should be presented to the user to make sure that it is entered recognized (via OCR) and translated properly. Once the user confirms the update data the serviced log record can be permanently updated. The permanently updated service log is read only, and therefore, may not be erased by a user. In the event that there is no more space available in the service log record, a second service log record may be created. The updated log record or a portion thereof can be reported, such as by printing it out or sending it to a remote server.

With reference to FIG. 1, there is shown a block diagram of an MFM 2 including one or more functional engines, which in the present example includes a print engine 4, a scan engine 6 and a fax engine 8 and at least one processor 10. The processor 10 is operatively connected to the function engines and a user input device 12, a display device 14, and communication circuitry 16.

The print engine 4, scan engine 6, and fax engine 8 each include functional devices for performing the printing, scanning (or copying), and faxing functions of the MFM 2. The function engines may share one or more components, such as a photoreceptor belt. Additionally, the function engines may be controlled by processor 10 and/or include its own dedicated processing device. MFM 2 may include one or more of the above function engines of any combination thereof.

MFM 2 and electronic circuitry associated therewith may be configured to communicate with peripheral hardware, user input device 12 (UID), operable by a user, such as for entering user data, instructions, and/or information into a service log form 200. For example, user input device 12 may include a keypad, a swipe card reader, a touch screen and any other suitable means for entering information and/or communicating with the MFM 2.

Display device 14 can be any suitable display device capable of communicating images to the user, such as for example, monitors including liquid crystal displays and the like. Input from the optical character recognition module (OCR) 34 is transmitted to display device 14.

The communication circuitry 20 provides communication between processor 10 and a remote server 18 and/or personal computer 20, e.g., via network 22, where network 22 may be the Internet, an intranet, LAN, WAN, etc.

One or more storage device 24 is provided which is accessible by the processor(s) 10. The one or more storage device 24 or a portion thereof may be removable or external from the MFM 2. The one or more storage device 24 includes one or more types of storage devices, such as a hard disk drive (HDD), RAM, ROM, CD-ROM, DVD, and flash memory. A plurality of software modules 26 are stored on the one or more storage device 24, where each software module has a set of programmable instructions executable by the at least one processor 10 for performing the functions disclosed herein and to achieve a technical effect in accordance with the disclosure. The functions of the respective software modules may be combined into one or more modules or distributed among a different combination of modules.

A service log module 28 is provided for creating an initial service log form 200 (see FIG. 2) and updating service log form 200. Upon creation, the service log form 200 may be stored in the at least one storage device 24. The service log form 200 may also be initially created by a device other than the service log module 28 of the MFM 2 and subsequently stored in storage device 24 of the MFM 2 using the scanning features of the MFM 2.

Auto fill module 30, as shown in FIG. 1, may be configured to update the following information into service log form 200 and/or the service log record: date and time; serial number; fault codes; CRU life; error messages; meter reads; and service parts and service reminders HSF. The information that auto fill module 30 may update, as herein described, is for illustrative purposes only and in no way should be construed as limiting. Data that is entered into auto fill fields 202 may stored in and/or communicated from processor 10, OCR 34 or any of the other previously described devices or modules.

A user interface module 36 is provided for interfacing between the processor 10 and the user input device 12, for receiving information input by the user and providing the information to the processor 10. User interface 36 may be configured to allow a user to retrieve the service log 200 from the MFM 2. In one embodiment, user interface module 36 may be adapted for use with "one touch" scanning and retrieving of the service log 200; as herein defined, "one touch" means that a user may scan and retrieve a service log form 200 with the touch of one button. User interface module 36, allows a user to type information into the service log form 200 by typing the information directly into the MFM 2, wherein one or more modules operatively connected to the at least one processor 10 may be configured to electronically fill and/or update the appropriate field(s) of service log form 200.

A print software module 38, scan software module 40 and/or fax software module 42 are provided for interfacing between the processor 10 and the respective function engines, such as for providing control of the respective function engines, handling data passed between the processor 10 and the respective function engines, etc. In an embodiment, scan module 40 may be configured to operate with the scan-to-print, scan-to-file, scan-to-fax, and scan-to-email functions of the MFM 2.

An exemplary service log form 200 is shown in FIG. 2. The service log form 200 includes auto fill fields 202 which are automatically filled in by the auto fill module 30 and user entry fields 204 which are manually filled in by a user.

Figure 3A:
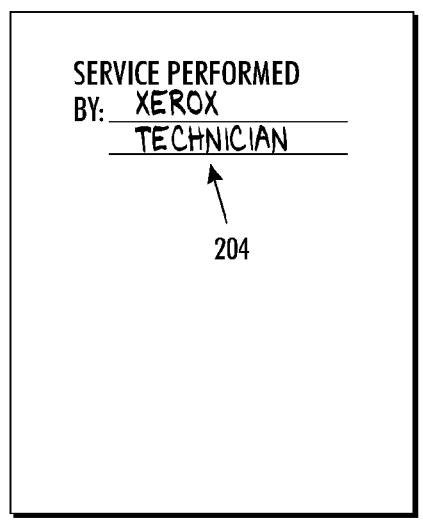
FIG. 3A illustrates a user fill field of the service log form depicted in FIG. 2 in accordance with the present disclosure.

User entry fields 204 may include a space for accommodating handwritten and/or typewritten text (see FIG. 3A). The handwritten and/or typewritten text may include, but is not limited to, information such as a brief description of service performed, the company or individual performing the service and the like. It should be emphasized that the information that can be entered into the service log form 200 will depend on the individual needs of a user. As a result, auto fill fields and user fill fields, 202 and 204, respectively, may be configured to include and/or receive any information that a user may deem useful.

It is contemplated that MFM 2 may include an optical character recognition (hereinafter OCR) module 34 in operative communication with the at least one processor 10 and any modules operatively connected therewith. For example, OCR module 34 may receive input from the scan engine 6. OCR module 34 may be configured to include any and all necessary components needed to operate as intended. OCR module 34 may be configured to operate similarly to conventional OCRs known in the available art. That is, OCR module 34 may be configured to translate images of handwritten or typewritten text into machine-editable text or translate pictures of characters into a standard encoding scheme representing them. OCR module 34 may be configured to translate the typewritten text and reenter the translated typewritten text back into user fill field(s) 204 of service log form 200. The translated data is output from the OCR 34 to the service log module which updates the service log form 200 accordingly and stores the updated form into the service log record.

Figure 3B:
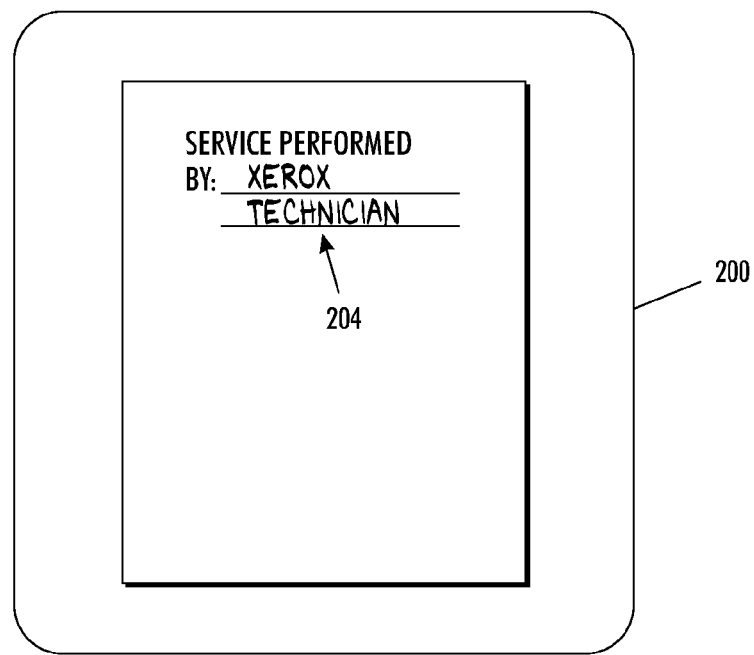
FIG. 3B illustrates the user fill field depicted in FIG. 3A as viewed via a display device in accordance with the present disclosure.

In an embodiment OCR 34 may be operatively connected to a display 14; a more detailed description of display 14 and operative features associated therewith to be described in below. Having an OCR module 34 operatively connected to display 14 can allow a user (e.g., service personal) to view the handwritten or typewritten text entered into user entry fields 204 of service log form 200 (see FIG. 3B).

Alternatively, OCR module 34 may be operatively connected to print module 38, wherein a user may print service log form via the print engine of the MFM 2 for viewing.

Further provided is a transmission module 32 for outputting stored service log forms 200 to a local or remote user or device. The transmission module 32 receives a request to transmit the service log form 200. The request might be received from a remote user or device, such as remote server 18, a local user, e.g., via the user input device 12, or based on the occurrence of an event, such as a scheduled task or upon an update to the service log form 200. The request specifies the format of data to be transmitted and the output medium to be used, e.g., display by sending retrieved from to display device, print by sending retrieved form to print engine, fax by sending retrieved form to fax engine, send by data transmission to a remote device by sending retrieved form to the remote server 18 via the communication circuitry 16.

The modules 28, 30, 32, 34, 36, 38, 40, and 42 may also include additional programmable instructions capable of being executed by the at least one processor 10 for performing other functions, such as storing contact information, storing sent and received service logs, searching service log forms for particular keywords, adding attachments to composed service logs, etc. The MFM 2 can also include additional modules for performing these and other functions.

A brief description of one example in which the service log system is operationally used now follows. The following example is for illustrative purposes only and is in no way to be construed as limiting. In operation, a blank service log form 200 may created and initialized at the time the software is installed. Alternatively, the service log form 200 may be initialized and stored in memory before a consumer purchases it. The initialized form may include auto fill field data, e.g., the serial number of the MFM.

During a routine maintenance and/or repair call, hereinafter referred to as work order, a user, for purposes herein a user may be a repairman, an administrator or someone with special privileges designated to work on the MFM2, may request the service log form 200 or use an already pre-printed service log form 200. For example, a user may request service log form 200 by the "one touch" option, via the user interface device 12. Prior to retrieving the service log form 200, a user may be prompted by the user interface device 12 to enter information (e.g., a company code), at which time, the auto fill module 30 may be configured to auto fill the appropriate auto fill fields 202 of the service log form 200 and the service log record with the entered information. At the time the request is made, the request may be communicated from the processor 10 to print module 34.

After the information is entered and all auto fill field(s) 200 have been updated, the service log form 200 may be printed out by the printing engine 4. The user may then proceed to perform the required work, as identified on the work order, to the MFM 2. Upon completion of the work, a user may enter information, via any of the previously described manners, e.g., a pen, into user fill field(s) 204. Service log form 200 may then be scanned, using the scanning features of the MFM 2, to the service log module 28, at which time the auto fill module 30 may be configured to auto fill the auto fill field(s) 202 with any additional information deemed necessary (e.g., the time the work order is completed) or any other sensed conditions. The updated service log form 200 is stored on the storage device 24, where the updated service log form 200 includes information scanned in and translated by the OCR module 34 and information entered by the auto fill module 30. The previous version may be retained, such as until the user verifies that the updates are correct. The transmission module 32 may be prompted automatically or by the user to retrieve the updated service log form 200 from the storage device 24 and display it via display 14 of MFM 2 for the user to preview, correct and/or confirm. The user may correct the form as necessary via the user input device 12, by rejecting the current update and/or by scanning in a new updated form. The scanned in service log form 200 may be output via any of the scan-to-print, scan-to-file, scan-to-fax, and scan-to-email functions of the MFM, 2 Once the user confirms the updated log form 200, the updated log form 200 may be transmitted by the transmission module 32 upon user request or upon recognition of a successful service log form 200 update. The transmission module 32 may transmit the updated log form 200 to the display device 14, the print engine 4, the fax engine 8 and/or a remote server 18 via the communication circuitry 16. The service log record is then updated with the most current service log form 200 information. As previously described, the service log record is read only, thus, once the user confirms the updated log, the service record cannot be altered.

If a second maintenance and/or repair call is required, a user may follow the same and/or similar steps outlined above.

From the foregoing and with reference to the various figure drawings, those skilled in the art will appreciate that certain modifications can also be made to the present disclosure without departing from the scope of the same It is contemplated that the service log system may be accessible to someone other than the worksite user. For example, if a user should require the help of a technology assistant (e.g., engineering personal), the service log form 200 and information contained thereon may be e-mailed, faxed, and/or electronically accessible to the engineering personal.

It is further contemplated that the service log system may create an initial service log form that is updated each time a service technician performs work to the MFM 2. In this embodiment, the service log form is configured to maintain a service log record. Thus, each time a user performs work on the MFM 2, the service log form may be printed and updated as in a manner previously described.

It is envisioned that service log may be configured for "call-ahead" operation. That is, the work order may be directly communicated, via the internet, to the MFM 2, wherein the service log module 28 may be configured to receive the requisite work order. In this embodiment, the service log module sends the work order to the user interface module 36. Once received, the use interface module may display or print the work order, via the display 14 or print engine 4, respectively.

Figure 4:
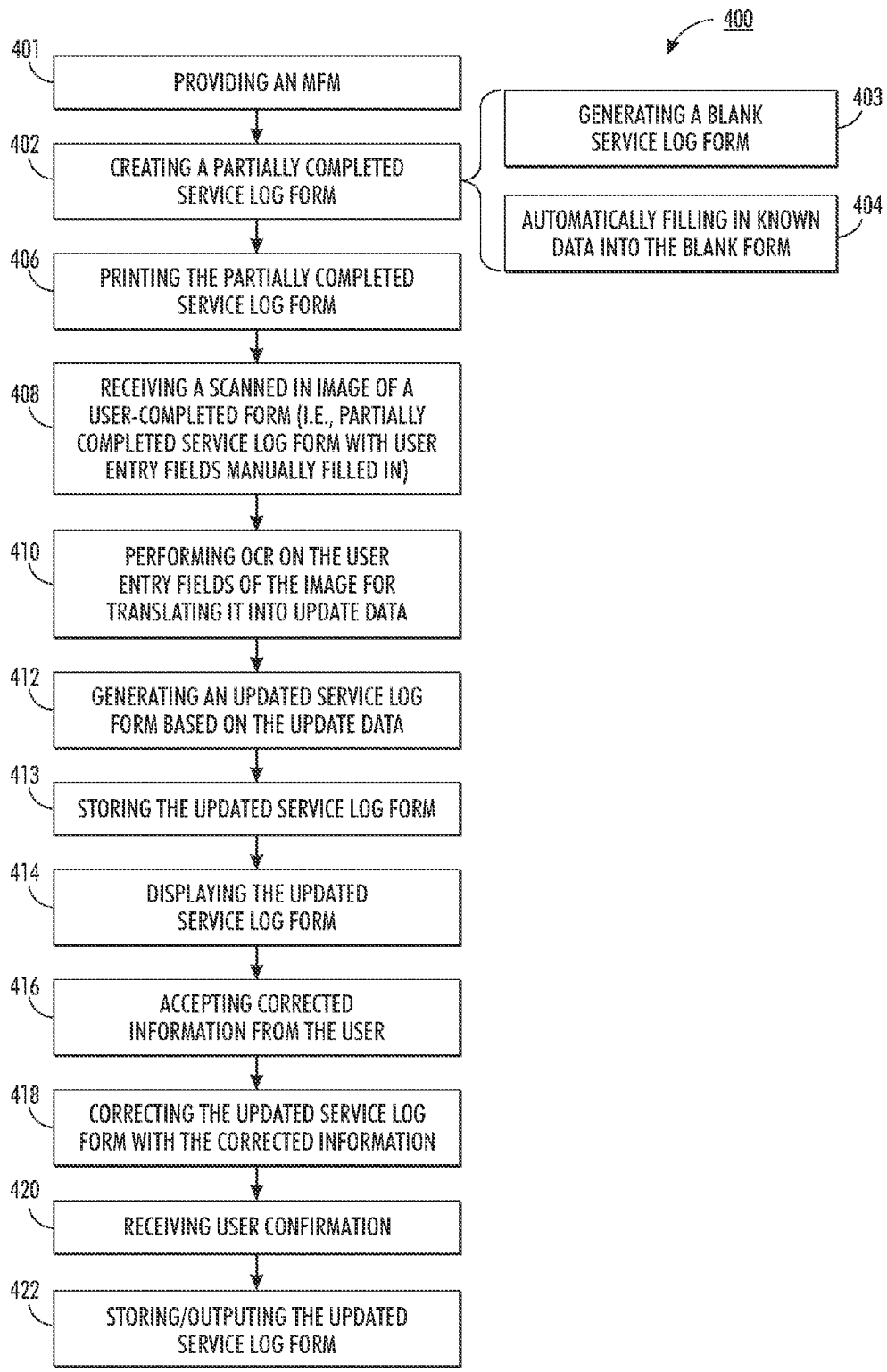
FIG. 4 is a flow chart illustrating a method for logging maintenance and service of a multi-function machine in accordance with the present disclosure.

With reference to FIG. 4 there is shown a flow chart 400 illustrating a method for logging servicing of MEM 2. At step

401, providing an MFM (i.e., a multi-function machine), At step 402, creating a partially completed service log form for that MFM by, at step 403, generating an initial blank service log form and, at step 404, upon request to service the MFM auto filling in known data into the blank form. At step 406, printing the partially completed service log form, which has been auto filled with known data. At step 408, receiving a scanned in image of a user-completed service log form. The scanned in image including both auto filled entries and user-entered entries placed in user entry fields following servicing. At step 410, performing OCR on the user entry fields of the image for translating it into update data. At steps 412-413, updating the service log form with the translated update data and the auto filled data and storing it. At step 414, displaying the updated portion of the service log form to the user via display device 14. At step 416, accepting corrected information from the user via the user input device 12. At step 418 correcting the updated service log form with the received correction information. At decision step 420, proceeding to step 422 upon confirmation by the user, else returning to step 414. At step 422, storing the updated service log form and outputting it as requested by the user or other device, e.g., printing the updated service log form.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A multi-function printing machine comprising:
    a print engine;
    a one-touch button selectable by a user;
    at least one storage device;
    at least one processor executing instructions stored in said at least one storage device so as to perform the following:
        in response to a single touch of said one-touch button, auto filling known data into auto entry fields of a blank service log form for said multi-function machine so as to generate a partially completed service log form, said known data being stored on said at least one storage device and comprising at least a number corresponding to said multi-function printing machine; and
        causing said print engine to output a printed copy of said partially completed service log form to said user for subsequent completion; and
    a scanner scanning in a document and generating a corresponding image of said document, said document comprising a completed service log form for said multi-function printing machine, said completed service log form comprising said auto entry fields filled-in with said known data and user entry fields filled-in onto said printed copy of said partially completed service log form with user-entered data related to servicing of said multi-function printing machine by said user;
    said processor further executing said instructions so as to perform the following:
        performing optical character recognition (OCR) on said image so as to translate contents of said user entry fields into update data;
        generating, based on said update data, an updated service log form, said at least one storage device storing said updated service log form; and
        outputting said updated service log form on-demand.

2. The multi-function printing machine according to claim 1, further comprising:
    a display device displaying said updated service log form to said user prior to storage of said updated service log form by said at least one storage device; and
    a user input device receiving corrected information from said user, said at least one processor further correcting said updated service log form based on said corrected information.

3. The multi-function printing machine according to claim 1, said outputting comprising outputting to any one of a display device of said multi-function printing machine, a print engine of said multi-function printing machine, a fax engine of said multi-function printing machine and a remote server.

4. The multi-function printing machine according to claim 1, said multi-function printing machine comprising a xerographic multi-function printing machine.

5. The multi-function printing machine according to claim 1,
    said known data further comprising any of a date and time, fault codes, error messages, meter reads and service reminders, and
    said user-entered data comprising at least a brief description of a service performed on said multi-function printing machine and by whom.

6. The multi-function printing machine according to claim 1, said blank service log form initially created by a device other than said multi-function printing machine.

7. The multi-function printing machine according to claim 1, said outputting comprising outputting to at least one of a scan-to-print function, a scan-to-file function, a scan-to-fax function, and a scan-to-email function of said multi-function printing machine.

8. The multi-function printing machine according to claim 1, further comprising a user input device comprising any of a keypad, a swipe card reader and a touch screen.

9. A method for maintaining and servicing a multi-function printing machine, said method comprising:
    scanning in, by said multi-function printing machine, a document, said document comprising a completed service log form for said multi-function printing machine, said completed service log form comprising auto entry fields filled-in with auto-entered data and user entry fields filled-in onto a printed service log form with user-entered data, said auto-entered data comprising known data comprising at least a number corresponding to said multi-function printing machine and said user-entered data being related to servicing of said multi-function printing machine by said user;
    generating, by said multi-function printing machine, a corresponding image of said document;
    performing, by said multi-function printing machine, optical character recognition (OCR) on said image as to translate contents of said user entry fields into update data;
    generating, by said multi-function printing machine and based on said update data, an updated service log form;
    storing, in a storage device of said multi-function printing machine, said updated service log form; and
    outputting, by said multi-function printing machine, said updated service log form on demand.

10. The method according to claim 9, further comprising:
    before said storing of said updated service log form, displaying, by said multi-function printing machine on a display device, said updated service log form;

receiving, by said multi-function printing machine from said user via a user input device, corrected information with regard to said updated service log form; and correcting, by said multi-function printing machine and based on said corrected information, said updated service log form.

11. The method according to claim 9, said outputting of said updated service log form comprising outputting said updated service log form to any one of a display device of said multi-function printing machine, a print engine of said multi-function printing machine, a fax engine of said multi-function printing machine and a remote server.

12. The method according to claim 9, said completed service log form comprising a blank service log form initially created by a device other than said multi-function printing machine, said auto entry fields being filled in by said device other than said multi-function printing machines to create a partially completed service log form, and said partially completed service log form being subsequently completed by said user.

13. The method according to claim 12, said user-entered data comprising at least a brief description of a service performed on said multi-function printing machine and by whom.

14. A method for maintaining and servicing a multi-function printing machine, said method comprising:

receiving, by said multi-function printing machine via a single touch of a one-touch button, a request from a user for a service log form;

creating, by said multi-function printing machine, a blank service log form having user entry fields and auto fill entry fields;

auto filling, by said multi-function printing machine in response to said request, known data into said auto fill entry fields on said blank service log form to generate a partially completed service log form, said known data being stored on a storage device of said multi-function printing machine and comprising at least a number corresponding to said multi-function printing machine;

printing, by said multi-function printing machine, said partially completed service log form;

scanning in, by said multi-function printing machine, a document, said document comprising a completed service log form for said multi-function printing machine, said completed service log form comprising said user entry fields filled-in onto said printed partially completed service log form by said user with user-entered data, said user-entered data being related to servicing of said multi-function printing machine by said user;

generating, by said multi-function printing machine, a corresponding image of said document;

performing, by said multi-function printing machine, optical character recognition (OCR) on said image as to translate contents of said user entry fields into update data;

generating, by said multi-function printing machine and based on said update data, an updated service log form;

storing, in a storage device of said multi-function printing machine, said updated service log form; and outputting, by said multi-function printing machine, said updated service log form on demand.

15. The method according to claim 14, further comprising:

before said storing of said updated service log form, displaying, by said multi-function printing machine on a display device, said updated service log form;

receiving, by said multi-function printing machine from said user via a user input device, corrected information with regard to said updated service log form; and correcting, by said multi-function printing machine and based on said corrected information, said updated service log form.

16. The method according to claim 14, said known data further comprising any of a date and time, fault codes, error messages, meter reads and service reminders, and said user-entered data comprising at least a brief description of a service performed on said multi-function printing machine and by whom.

17. The method according to claim 14, said outputting comprising outputting to at least one of a scan-to-print function, a scan-to-file function, a scan-to-fax function, and a scan-to-email functions-of said multi-function printing machine.

* * * * *